J. F. JOHNSON.
ROLLER RACK.
APPLICATION FILED AUG. 25, 1913.

1,096,722.

Patented May 12, 1914.

UNITED STATES PATENT OFFICE.

JOHN FRANK JOHNSON, OF BATTLE CREEK, MICHIGAN.

ROLLER-RACK.

1,096,722.

Specification of Letters Patent.  Patented May 12, 1914.

Application filed August 25, 1913. Serial No. 786,450.

*To all whom it may concern:*

Be it known that I, JOHN FRANK JOHNSON, a citizen of the United States, residing at Battle Creek, in the county of Calhoun and State of Michigan, have invented certain new and useful Improvements in Roller-Racks; and I hereby declare that the following is a full, clear, and exact description thereof, reference being had to the accompanying drawings, which form part of this specification.

This invention is a novel frame, or rack, particularly designed for holding the inking rollers of printing presses when not in use; and adapted to hold a number of such rollers while being washed or cleaned.

The invention is an improvement upon the rack shown in my Patent No. 722,514, of March 10, 1903, and the object of the invention is to so construct the rack that it will be adapted to hold rollers of different lengths, so that one rack can hold the rollers for two or more presses, although the rollers thereof may be of different lengths. The rack is also provided with a shelf for cans and tools and with a can in which the roller cleaning rags and waste may be placed.

The invention is particularly adapted for use in job printing offices where various presses are employed, and whose rollers may be of different lengths. The inking rollers of such machines can be conveniently stacked on my rack and cleaned while in position thereon.

I will explain the invention as embodied in the form illustrated in the accompanying drawings, but I do not consider the invention restricted to the specific construction of parts illustrated therein, and the claims set forth what I desire to protect by these presents.

Figure 1:
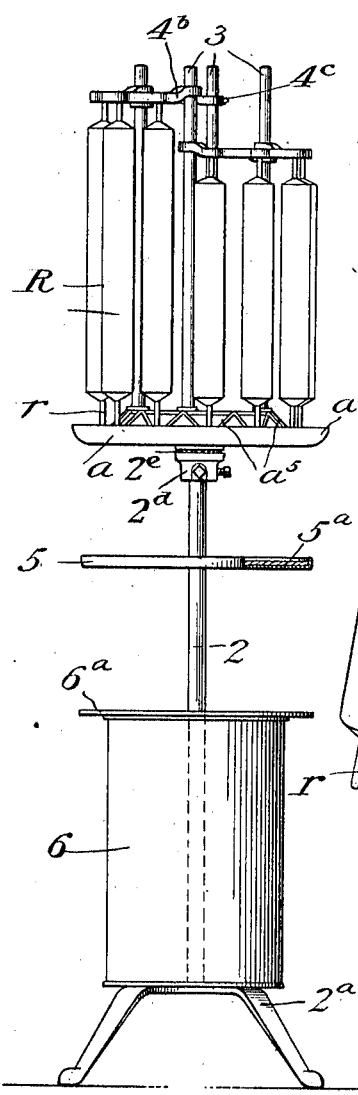
Figure 2:
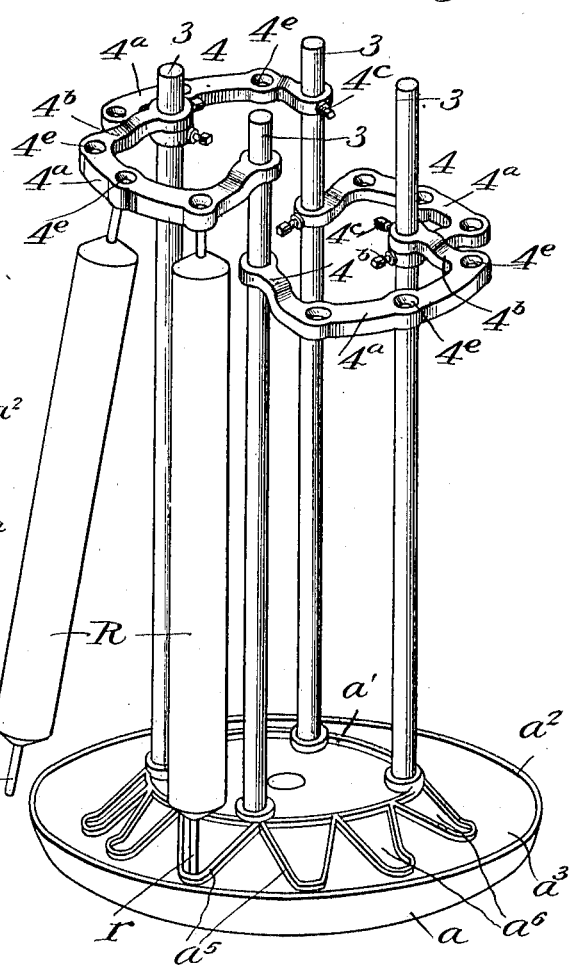
Figure 3:
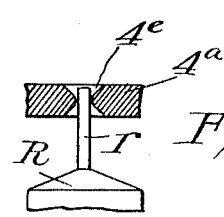

Referring to the drawings:—Figure 1, is a perspective view of the complete rack. Fig. 2, is an enlarged perspective view of the rack proper showing the arrangement of the adjustable upper roller retainers. Fig. 3, is a detail.

As shown in the drawings, the rack proper comprises a base plate $a$ which is preferably constructed as described in my aforesaid patent, and has a flange $a^1$ at top, and an upturned flange $a^2$ around its lower edge, forming a channel $a^3$; and on the inclined surface of the plate $a$, between flanges $a^1$ and $a^2$, are a series of V-shaped ribs $a^5$ which divide the surface of the plate $a$ into a series of V-shaped spaces $a^6$; the ribs $a^5$ will direct the lower ends or journals $r$ of any inking-roller R, placed on any space $a^6$ of the base-plate into correct position thereon, so that the operator does not have to be particularly careful in placing the rollers on the base-plate, and the weight of the rollers assists in properly positioning them upon the base-plate. Said base-plate $a$ may be mounted upon any suitable support; but in order to have the rack easily transportable it is shown as mounted upon a standard 2 which is supported on a spider-base $a^2$. The base-plate $a$ is preferably mounted on a casting or collar $2^d$ attached to the upper end of the standard 2 and provided with roller bearings $2^c$ so that the rack can be easily rotated without friction. To said plate $a$ are attached vertical rods 3, four such rods being shown, spaced equi-distant. To these rods are adjustably attached segmental U-shaped yokes, or castings 4 which have outer curved portions $4^a$ and inwardly extending ends $4^b$ which are perforated to engage the rods 3. Each yoke is strung upon two rods 3, and is vertically adjustable thereon and can be secured in any position, to which it is adjusted, by means of set-screws $4^c$, or other suitable devices.

The outer portion $4^a$ of the yokes 4 are provided with apertures $4^e$ corresponding in distances apart with the spaces $a^6$. These openings $4^e$ are preferably countersunk at both top and bottom, so as to facilitate the engagement of the roller trunnions with the openings $4^e$, or their removal therefrom, see Fig. 3. In the example shown, each yoke has three openings $4^e$; and there are four yokes, each yoke of which extends for one-fourth of the circumference of the plate $a$; said plate $a$ in the example shown, has twelve V-spaces $a^6$. If desired, the yokes could be made of greater extent; or the number of rods and yokes could be increased and the number of V-spaces in the plate $a$ increased, according to the total number of rollers which it is desired that the rack should be capable of holding. Two of the yokes 4 are shown as adjusted to a plane below the other two yokes; and the lower yokes are used for inking rollers of one length and the higher yokes are used for longer inking rollers.

In placing a roller in the rack, its upper trunnion is first entered into one of the apertures $4^e$ of the proper yoke, and then its lower trunnion is slipped into the corresponding V-space $a^6$, below such aperture. The roller will remain in place by gravity. By simply lifting the roller slightly its lower end can be disengaged from the V-space and then it can be readily removed from the yoke: as indicated in Fig. 2.

The rack is so constructed that the rollers are retained thereon in vertical position, and can be readily removed and replaced, and the rack may be rotated so that the operator can place, or remove, or clean, the rollers without having to walk around the rack to do so.

While primarily designed to be used in cleaning the inking rollers, the rack is also useful for holding the rollers, while the press is out of operation, in readily accessible condition. The rack occupies very little floor space, and the rollers thereon are less liable to injury.

In the rack shown, a circular shelf 5 is attached to the standard 2, below the plate $a$, which shelf may be provided with a glass slab $5^a$ for ink mixing purposes; and said shelf is used to hold oil cans, and articles that are in daily use. A rag can 6 is also mounted on the spider $2^a$ below the shelf 5, and this can may be divided into compartments for soiled rags, and clean rags or waste, and it is provided with a cover $6^a$ that may be strung on the standard 2 and will automatically drop into place and close the can. The utility and convenience of such a rack is obvious, and will be readily appreciated by pressmen.

Preferably the yokes $4^a$ are enlarged, as shown, adjacent the apertures $4^e$ so that the operator can readily locate the apertures by such enlargements, and does not have any difficulty in inserting the roller journals into the apertures.

If all the rollers are of the same length, the yokes can all be adjusted to the same plane on the uprights, and by reversing the alternate yokes they will form a practically complete circle with all the apertures in the same horizontal plane.

As above stated, the number of yokes and uprights can be varied according to the desired size and capacity of the rack.

What I claim is:—

1. A rack for printers' rollers having a base plate having a downwardly inclined portion provided with a series of divisions, a plurality of U-shaped yokes above the plate provided with apertures corresponding with the said divisions and adapted to retain the upper trunnions of the rollers standing upon the divisions of the base plate, and parallel rods supporting and connecting the adjacent ends of adjacent yokes.

2. A rack for printers' rollers comprising a base plate, a plurality of vertical rods spaced apart and supported on said base, and a plurality of yokes each having its ends connected to two of said rods the adjacent ends of adjacent yokes being attached to the same rod, said yokes being adapted to retain the upper ends of rollers supported on the base plate.

3. A rack for printers' rollers comprising a base plate, parallel vertical rods supported on said base, and yokes having their opposite ends connected to adjacent rods, said yokes being adapted to retain the upper ends of rollers supported on the base plate, the adjacent ends of adjacent yokes being attached to the same rod said yokes being adjustable to different heights on the rods to accommodate rollers of different lengths.

4. In a rack for printers' rollers, the combination of a standard, a base plate rotatably mounted thereon, parallel rods connected with and rising from said base plate, segmental yokes each connected to adjacent rods above the base plate and adjacent ends of adjacent yokes being also connected to the same rod, said yokes being adapted to retain the upper ends of rollers supported on the base plate, said yokes bracing the rods and being independently vertically adjustable thereon so that the rack may accommodate rollers of different lengths.

5. A rack for printers' rollers comprising a base plate having a downwardly inclined portion provided with a series of divisions, parallel vertical rods supported on said base, and U-shaped yokes connected to said rods provided with apertures corresponding to the divisions on the base plate and adapted to retain the upper ends of rollers supported on the base plate, the adjacent ends of adjacent yokes being attached to the same rod, and each yoke connecting adjacent rods, said yokes being vertically adjustable on the rods to accommodate rollers of different lengths.

In testimony that I claim the foregoing as my own, I affix my signature in presence of two witnesses.

JOHN FRANK JOHNSON.

Witnesses:
 ROSE M. LARDER,
 C. S. BUSH.